United States Patent
Ye et al.

(10) Patent No.: US 11,812,328 B2
(45) Date of Patent: Nov. 7, 2023

(54) METHOD AND SYSTEM TO ADAPTIVELY LOCALIZE A RADIO DEVICE

(71) Applicant: Red Point Positioning Corporation, Boston, MA (US)

(72) Inventors: Zhenzhen Ye, Westford, MA (US);
Mingda Zhou, Stoneham, MA (US);
Ed Guntin, Barrington, IL (US);
Yongsen Ma, Malden, MA (US)

(73) Assignee: Red Point Positioning Corporation, Boston, MA (US)

( * ) Notice: Subject to any disclaimer, the term of this patent is extended or adjusted under 35 U.S.C. 154(b) by 85 days.

(21) Appl. No.: 17/469,957

(22) Filed: Sep. 9, 2021

(65) Prior Publication Data
US 2023/0071850 A1    Mar. 9, 2023

(51) Int. Cl.
| | |
|---|---|
| H04W 4/021 | (2018.01) |
| H04W 4/029 | (2018.01) |
| H04W 72/30 | (2023.01) |

(52) U.S. Cl.
CPC ........... *H04W 4/021* (2013.01); *H04W 4/029* (2018.02); *H04W 72/30* (2023.01)

(58) Field of Classification Search
CPC ..... H04W 84/18; H04W 8/005; H04W 64/00; H04W 84/12; H04W 4/02; H04W 4/029; H04W 4/06; H04W 88/02; H04W 48/12; H04W 24/02; H04W 24/10; H04W 48/10; H04W 52/0229; H04W 4/021; H04W 52/0216; H04W 36/0061; H04W 84/045; H04W 52/0241; H04W 74/06; H04W 92/18; H04W 60/04; H04W 36/30; H04W 72/51; H04W 72/54; H04W 36/32; H04W 4/025; H04W 4/027; H04W 4/33; H04W 4/38; H04W 52/0245; H04W 8/24; H04W 92/10; H04W 12/104; H04W 12/63; H04W 12/65; H04W 28/0808; H04W 92/12; H04W 72/30; G01S 13/56; G01S 5/00; G01S 11/06; G01S 11/026; G01S 1/00; G01S 5/0284; G01S 5/0295; G01S 5/06; G01S 19/50; G01S 2205/02
See application file for complete search history.

(56) References Cited

U.S. PATENT DOCUMENTS

| | | | |
|---|---|---|---|
| 2007/0008069 A1* | 1/2007 | Lastinger | G06K 7/10297 340/10.1 |
| 2019/0251719 A1* | 8/2019 | Wang | H04W 4/026 |
| 2021/0136787 A1* | 5/2021 | Opshaug | H04L 5/0032 |
| 2022/0381871 A1* | 12/2022 | Raza | H04L 5/0044 |

FOREIGN PATENT DOCUMENTS

| | | | | |
|---|---|---|---|---|
| WO | WO-2018183571 A1 * | 10/2018 | | G01S 13/82 |

* cited by examiner

*Primary Examiner* — Nizar N Sivji
*Assistant Examiner* — Jing Gao
(74) *Attorney, Agent, or Firm* — GUNTIN & GUST, PLC; Mark Wilinski

(57) ABSTRACT

Aspects of the subject disclosure may include, for example, adaptively modifying a rate at which anchors broadcast messages into an area of interest based on tag presence status, where the messages may be used by tags to estimate tag position. Tag presence status may include an indication of whether a tag is present, a tag's position, velocity, acceleration, history, and the like. Areas of interest may be redefined based at least in part on tag presence status. Other embodiments are disclosed.

12 Claims, 12 Drawing Sheets

300

900

METHOD AND SYSTEM TO ADAPTIVELY LOCALIZE A RADIO DEVICE

FIELD OF THE DISCLOSURE

The subject disclosure relates to a method and system for determining the location of an object based on time difference of arrival (TDOA).

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, relative positions of objects, trajectory of objects, speed of objects, or combinations thereof.

BRIEF DESCRIPTION OF THE DRAWINGS

Reference will now be made to the accompanying drawings, which are not necessarily drawn to scale, and wherein.

DETAILED DESCRIPTION

Figure 1:
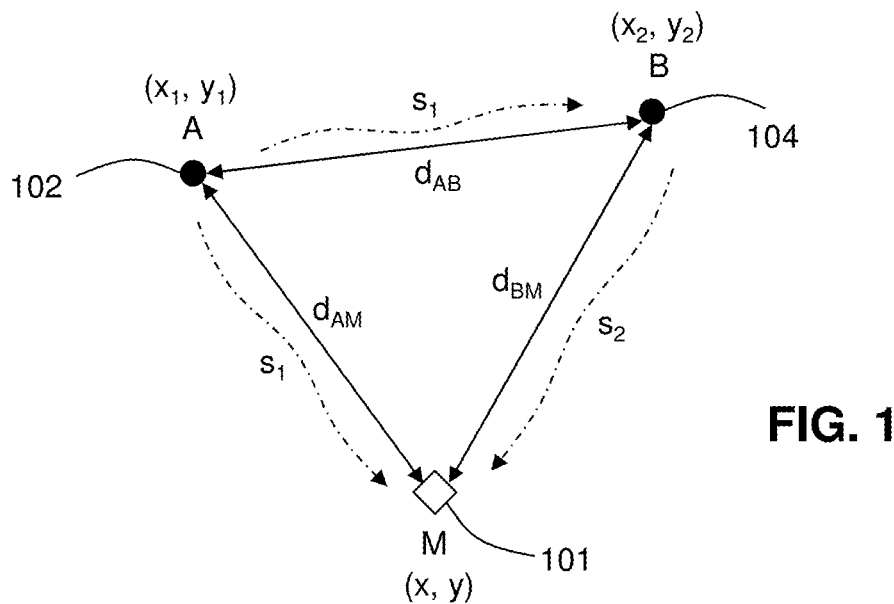
FIG. 1 is a block diagram illustrating an exemplary, non-limiting embodiment of a mobile tag and anchors for determining location information between the mobile tag and the anchors in accordance with various aspects described herein.

The subject disclosure describes, among other things, illustrative embodiments for determining location information between a mobile tag and one or more anchors. Other embodiments are described in the subject disclosure.

One or more aspects of the subject disclosure include an apparatus comprising a processing system including a processor, and a memory that stores executable instructions that, when executed by the processing system, facilitate performance of operations. The operations may include periodically broadcasting into an area of interest, by one or more pairs of anchors, wireless signals to enable tags in the area of interest to estimate tag position based at least in part on the wireless signals, determining a tag presence status in the area of interest, and responsive to the tag presence status, modifying a rate at which the wireless signals are periodically broadcast into the area of interest.

One or more aspects of the subject disclosure include a non-transitory, machine-readable medium, comprising executable instructions that, when executed by a processing system including a processor, facilitate performance of operations. The operations may include periodically broadcasting into an area of interest, by one or more pairs of anchors, wireless signals to enable tags in the area of interest to estimate tag position based at least in part on the wireless signals, determining a tag presence status in the area of interest, and responsive to the tag presence status, modifying a rate at which the wireless signals are periodically broadcast into the area of interest.

One or more aspects of the subject disclosure include a method, comprising commanding one or more pairs of anchors, by a processing system including a processor, to periodically broadcast wireless signals into an area of interest to enable tags in the area of interest to estimate tag position based at least in part on the wireless signals, determining, by the processing system, a tag presence status in the area of interest, and responsive to the tag presence status, modifying, by the processing system, a rate at which the wireless signals are periodically broadcast into the area of interest.

Additional aspects of the subject disclosure include wherein the determining the tag presence status comprises determining that no tag is present in the area of interest, wherein the determining the tag presence status comprises determining a tag type of at least one tag in the area of interest, redefining the area of interest based at least in part on the tag type, wherein the determining the tag presence status comprises receiving information from a wireless signal transmitted by at least one tag in the area of interest, wherein the determining the tag presence status comprises detecting an object's presence in the area of interest using a channel impulse response, wherein detecting the object's presence in the area of interest using the channel impulse response comprises measuring the channel impulse response when no objects are in the area of interest and comparing the channel impulse response to at least a portion of a signal received at an anchor, wherein the modifying the rate comprises modifying the rate when no tags are detected in the area of interest, and wherein the modifying the rate comprises modifying the rate based at least in part on a tag velocity in the area of interest. Other embodiments are described below.

Figure 2:
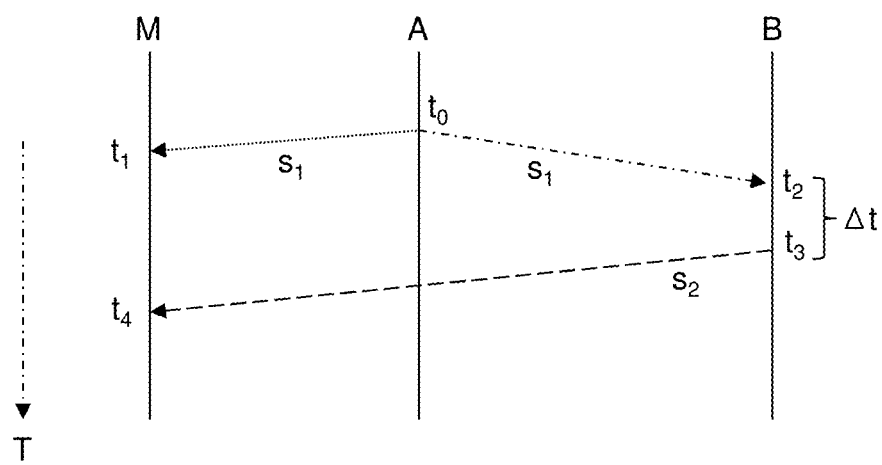
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time $t_0$, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t = t_3 - t_2$), or can receive this information in the second wireless signal ($s_2$) transmitted by anchor 104. The equations that follow can be used to calculate a first possible location of the mobile tag 101 relative to anchor pair 102, 104.

The distance between anchor 102 and the mobile tag can be represented as, $$d_{AM} = c(t_1 - t_0) \quad \text{(EQ 1)},$$

where c is the speed of light constant. Similarly, the distance from anchor 102 to anchor 104 can be represented as, $$d_{AB} = c(t_2 - t_0) \quad \text{(EQ 2)}.$$

Additionally, the distance from anchor 104 to the mobile tag 101 can be represented as, $$d_{BM} = c(t_4 - t_3) \quad \text{(EQ 3)}.$$

The total distance traveled by the first wireless signal ($s_1$) from anchor 102 to anchor 104 and the second wireless signals ($s_2$) from anchor 104 to mobile tag 101 can be represented as, $$d_{AB} + d_{BM} = c(t_2 - t_0 + t_4 - t_3) \quad \text{(EQ 4A)}.$$

To eliminate variable $t_0$, equation EQ1 can be subtracted from equation EQ 4A, resulting in, $$d_{AB} + d_{BM} - d_{AM} = c(t_2 - t_1 + t_4 - t_3) \quad \text{(EQ 4B)}.$$

Substituting $\Delta t = t_3 - t_2$ into EQ 4B results in equation, $$d_{AB} + d_{BM} - d_{AM} = c(t_4 - t_1 - \Delta t) \quad \text{(EQ 4C)}.$$

Since $d_{AB}$ is a constant known to the mobile tag 101 and the time variables of the factor $c(t_4 - t_1 - \Delta t)$ are also known to the mobile tag 101, EQ 4C can be rewritten as, $$d_{BM} - d_{AM} = \Delta d_1 \quad \text{(EQ 5)},$$

where $\Delta d_1 = c(t_4 - t_1 - \Delta t) - d_{AB}$, which are constants known to mobile tag 101. Furthermore, in an example of two-dimensional (2D) space, the distance between anchor 102 and the mobile tag 101 can be represented as, $$d_{AM} = \sqrt{(x-x_1)^2 + (y-y_1)^2},$$

and the distance between anchor 104 and the mobile tag 101 can be represented as, $$d_{BM} = \sqrt{(x-x_2)^2 + (y-y_2)^2}.$$

Substituting $d_{AM}$ and $d_{BM}$ in EQ 5 results in the following equation, $$\sqrt{(x-x_2)^2 + (y-y_2)^2} - \sqrt{(x-x_1)^2 + (y-y_1)^2} = \Delta d_1 \quad \text{(EQ 6)}.$$

Figure 3:
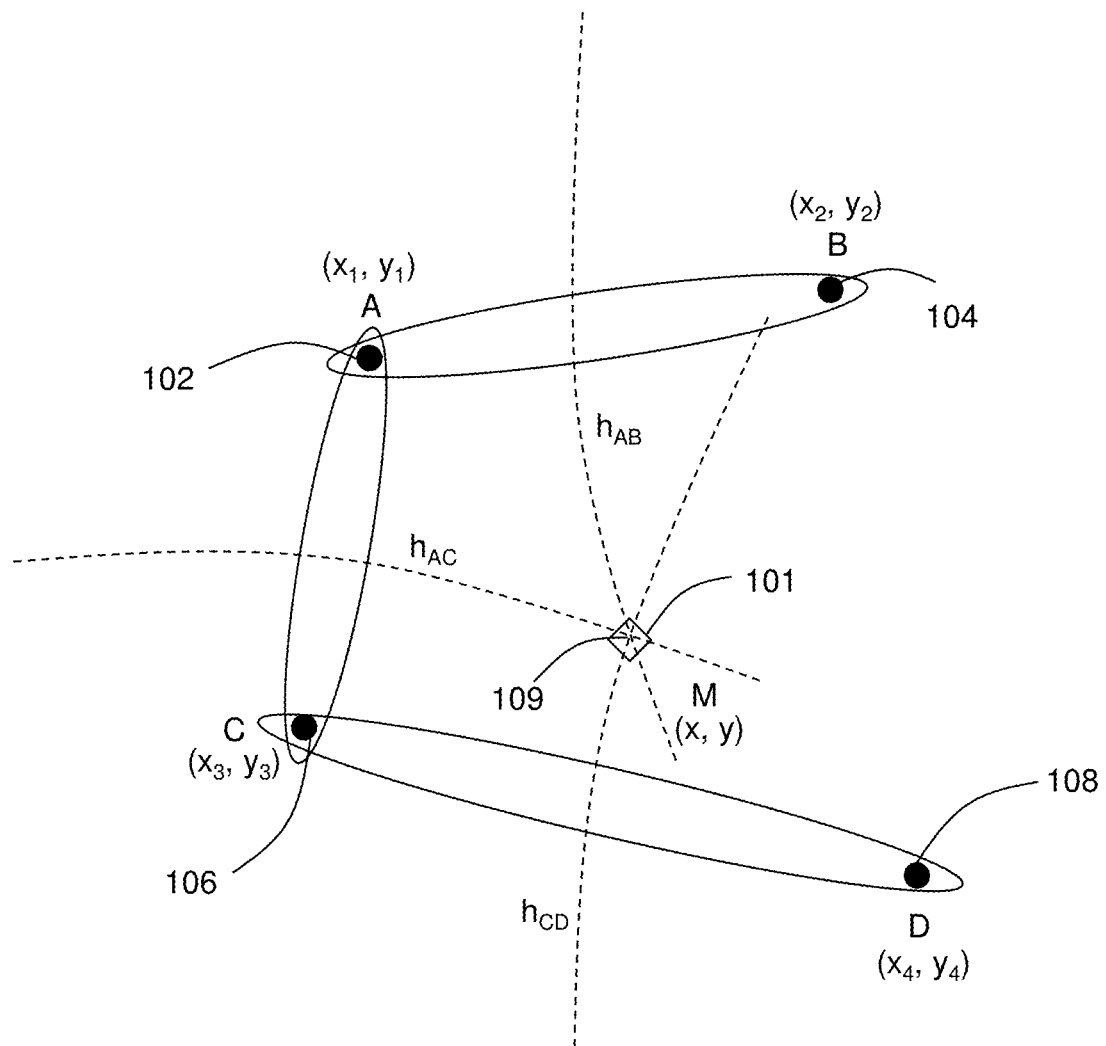
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors 102 and 104. Such a hyperbolic curve can be represented as, $$h_{AB} = \Delta d_1 \quad \text{(EQ 7A)},$$

where $h_{AB} = \sqrt{(x-x_2)^2 + (y-y_2)^2} - \sqrt{(x-x_1)^2 + (y-y_1)^2}$. The mobile tag 101 can be further configured to perform the above calculation across other anchor pairs as depicted in FIG. 3. For example, the mobile tag 101 can be configured to determine a hyperbolic curve between anchors 102 and 106 (i.e., anchors A and C) resulting in equation, $$h_{AC} = \Delta d_2 \quad \text{(EQ 7B)},$$

where $\Delta d_2$ is a constant known to mobile tag 101, and where $h_{AC} = \sqrt{(x-x_3)^2 + (y-y_3)^2} - \sqrt{(x-x_1)^2 + (y-y_1)^2}$. Additionally, the mobile tag 101 can be configured to determine a hyperbolic curve between anchors 106 and 108 (i.e., anchors C and D) resulting in equation, $$h_{CD} = \Delta d_3 \quad \text{(EQ 7C)},$$

where $\Delta d_3$ is a constant known to mobile tag 101, and where $h_{CD} = \sqrt{(x-x_4)^2 + (y-y_4)^2} - \sqrt{(x-x_3)^2 + (y-y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to anchor pairs 102 and 104 (anchors A/B), 102 and 106 (anchors A/C), and 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchor 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
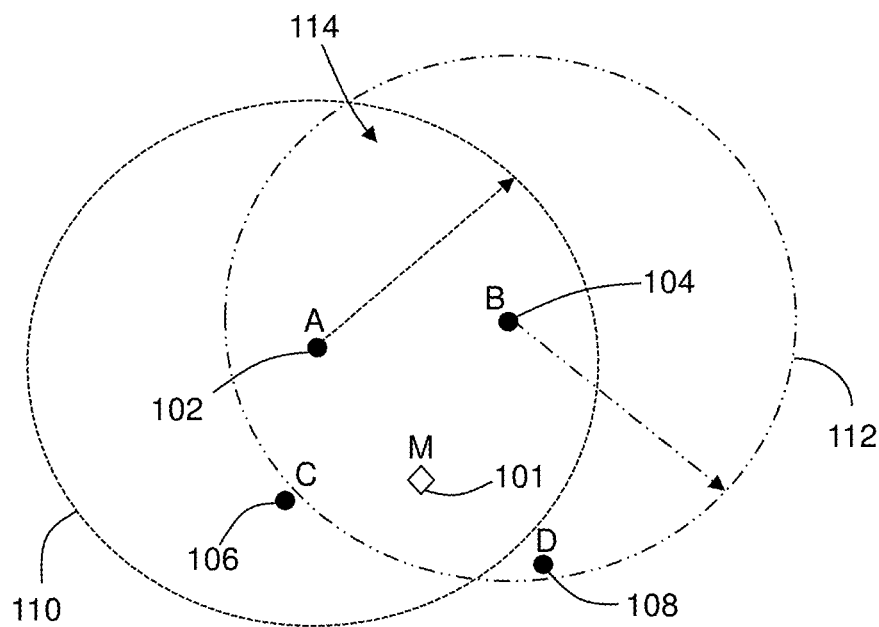
FIGS. 4A, 4B and 4C are block diagrams illustrating exemplary, non-limiting embodiments for selecting pairs of anchors in accordance with various aspects described herein.
Figure 4B:
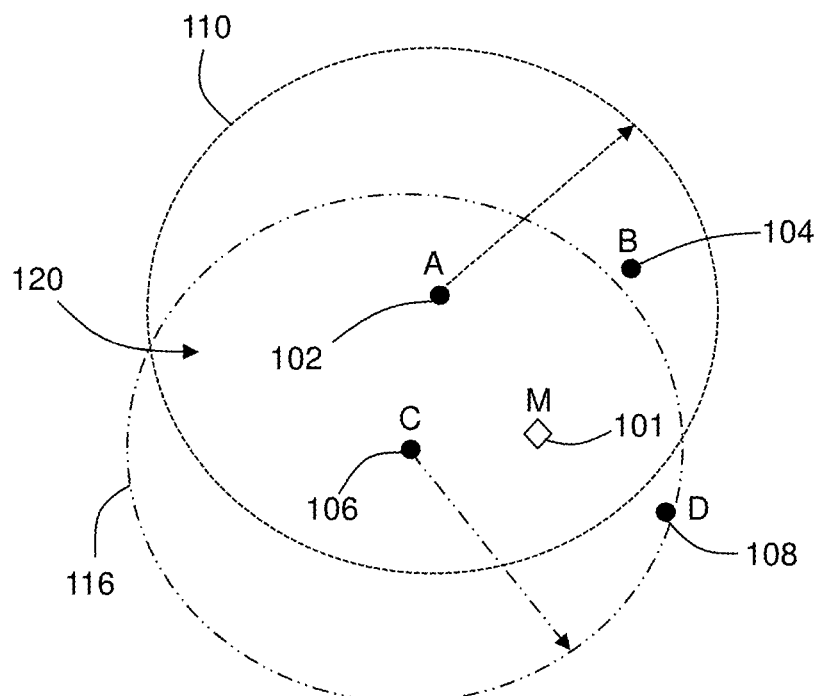
Figure 4C:
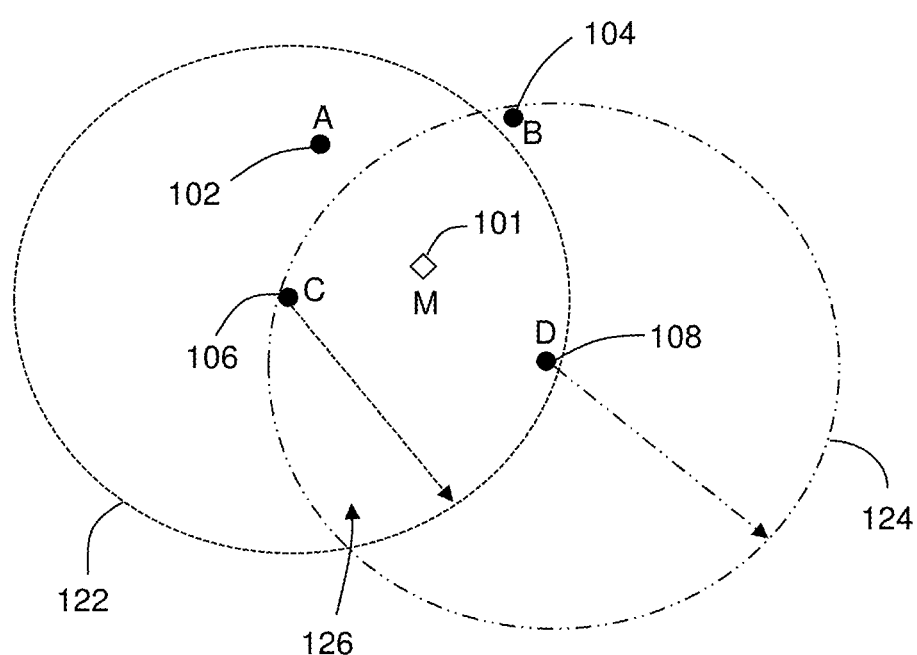

FIG. 4B shows that the coverage areas 110 and 116 of anchor pair 102, 106 (anchors A/C) create an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pair 106, 108 (anchors C/D) create an overlapping region 126 that encompasses anchors 106 and 108 and the mobile tag 101, thereby enabling the mobile tag 101 to calculate hyperbolic curve $h_{CD}$.

Figure 5:
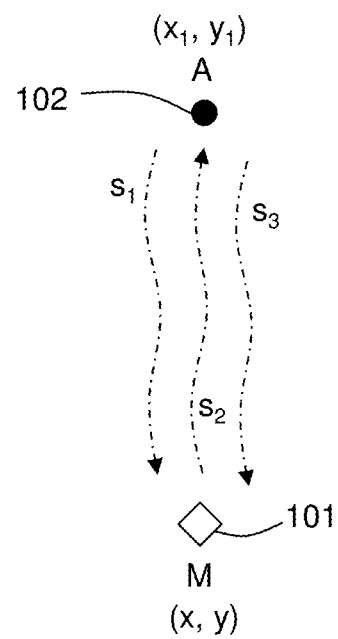
FIG. 5 is a block diagram illustrating an exemplary, non-limiting embodiment of a mobile tag and an anchor for determining location information between the mobile tag and the anchor in accordance with various aspects described herein.
Figure 6:
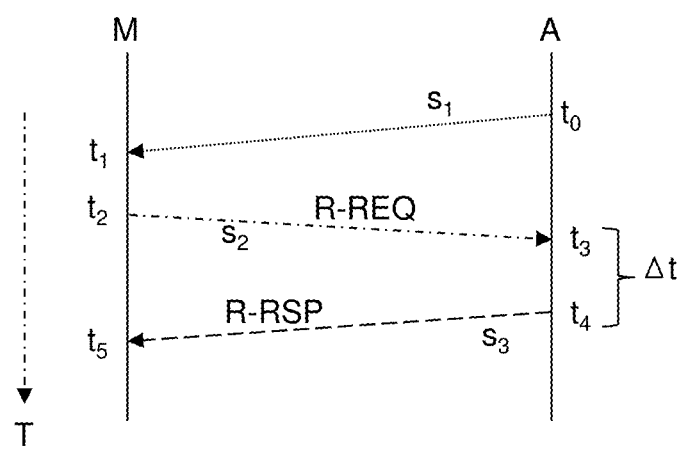
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, and as depicted in FIG. 6, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r\text{-}trip} = d_{AM} + d_{MA} \qquad (EQ\ 8),$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2) \qquad (EQ\ 9).$$

Similarly, the distance from anchor 102 to the mobile tag 101 can be determined by, $$d_{AM} = c(t_5 - t_4) \qquad (EQ\ 10).$$

With the above equations, the roundtrip distance can be rewritten as, $$d_{r\text{-}trip} = c(t_5 - t_4 + t_3 - t_2) \qquad (EQ\ 11).$$

As noted earlier, the time $t_0$ process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t) \qquad (EQ\ 12).$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA} = d_{r\text{-}trip}/2 \qquad (EQ\ 13).$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other.

It will be appreciated that the TDOA and TW-TOA processes described above can also be used between mobile tags 101. For example, FIGS. 1-3, 4A-4C, 5, and 6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, and 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
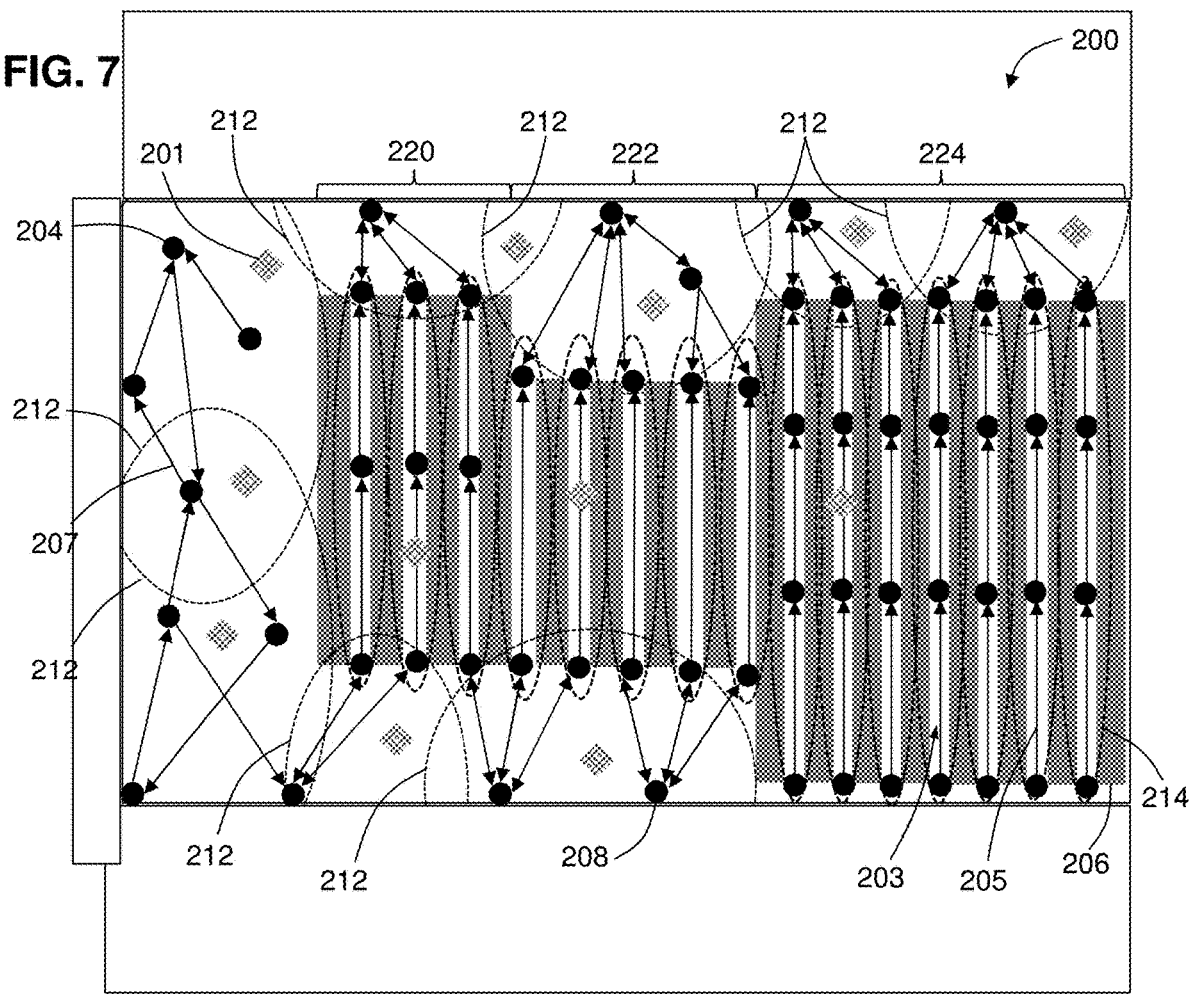
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications to which the subject disclosure can be applied. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and with line-of-site to pairs of anchors 204), the mobile tag 201 can be configured to perform TDOA measurements among pairs of anchors 204 as described above in relation to FIGS. 1, 2, 3, 4A, 4B, and 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa-see sections 220 and 224 and reference number 205. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
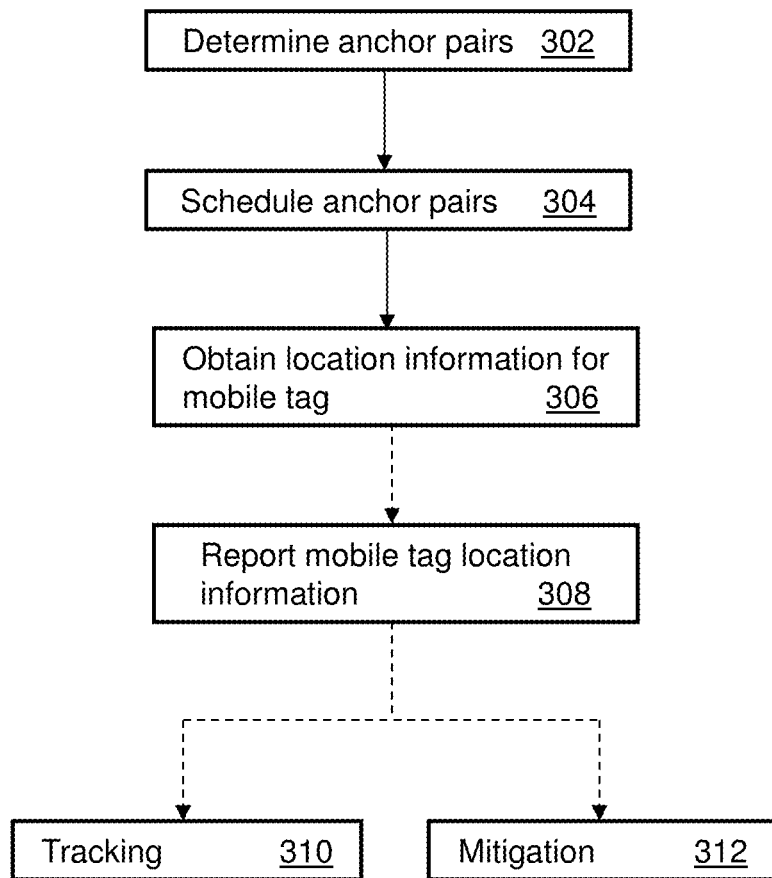
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system, such as a server (described below in relation to FIG. 12), is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
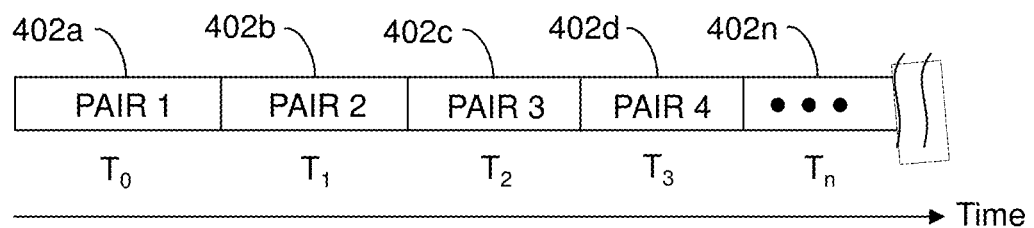
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals (e.g., reference number 207) in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$-$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 208 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in a region 212 (i.e., open spaces) or region 214 (i.e., aisles 203), the source anchors 204 can be configured to transmit in the first wireless signal ($s_1$) an indication of whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the look-up table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, 5, and 6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination of whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination of where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
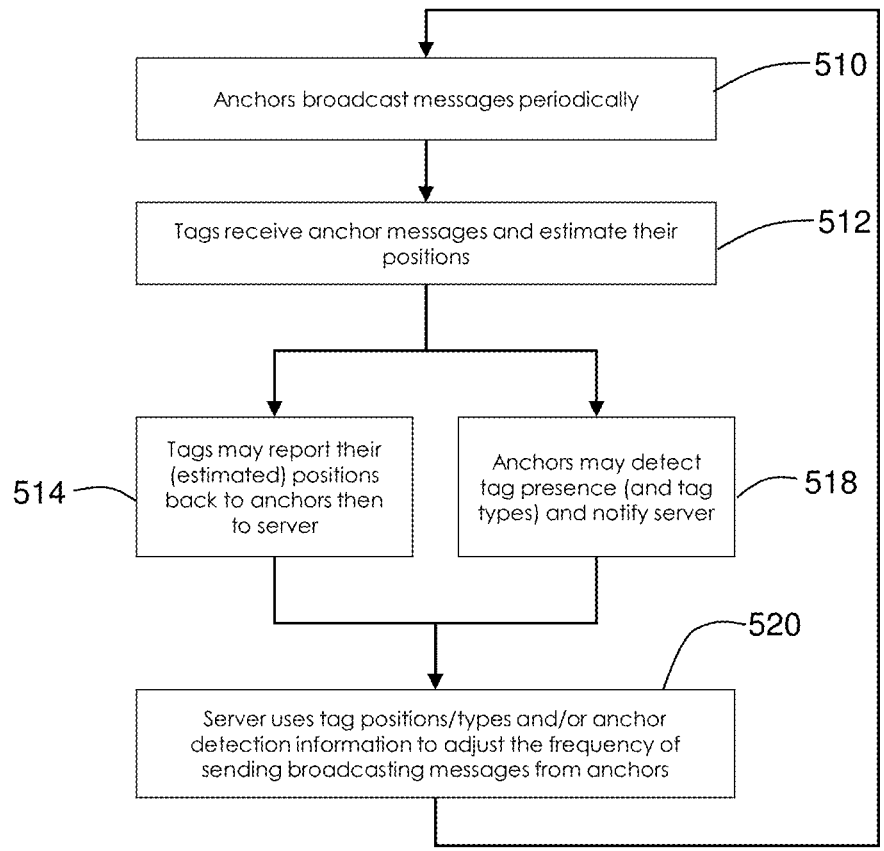
FIG. 10 is a block diagram illustrating exemplary, non-limiting embodiments of methods to adjust a frequency of anchor broadcasts in accordance with various aspects described herein.

FIG. 10 is a block diagram illustrating exemplary, non-limiting embodiments of methods to adjust a frequency of anchor broadcasts in accordance with various aspects described herein. In some embodiments, method 500 may be performed by a processing system that includes a processor. For example, method 500 may be performed by an anchor or multiple anchors in communication with each other. Also for example, method 500 may be performed by a server in communication with one or more anchors. The type and/or location of the processing system performing method 500 is not a limitation of the various embodiments.

At 510 of method 500, anchors periodically broadcast messages into an area of interest. In some embodiments, the messages are wireless signals that mobile tags may use to estimate their positions. For example, in some embodiments, the anchors may transmit wireless signals that mobile tags may use to perform a TDOA analysis and/or a TW-TOA analysis to estimate the tag position. The area of interest into which the anchors broadcast messages may be any of the demarcated areas, regions, aisles, etc. as described herein. For example, in some embodiments, the area of interest into which the anchors broadcast messages may be region 212 (an open space) or region 214 (an aisle 203) as described above with reference to FIG. 7. Further, the area of interest may correspond to the coverage area of an anchor, or the intersection of coverage areas of multiple anchors. Still further, the area of interest may correspond to the union of multiple intersecting coverage areas that together correspond to an open space region or demarcation area.

In some embodiments, the period at which the anchors broadcast messages may be determined by one or more anchors, and in other embodiments, the period at which the anchors broadcast messages may be determined by a server in communication with the anchors. In still further embodiments, the period at which the anchors broadcast messages may be determined by a combination of anchors and servers.

At 512, mobile tags receive the messages broadcast at 510 and estimate tag positions. For example, in some embodiments, mobile tags in the area of interest receive the messages broadcast at 510 and perform a TDOA analysis. Also for example, in some embodiments, mobile tags in the area of interest receive the messages broadcast at 510 and perform a TW-TOA analysis. In some embodiments, the actions of 512 may be omitted. For example, in the case that no mobile tags are present in the area of interest, then no mobile tags will receive the anchor messages and estimate tag positions.

At 514 and/or 518, the tag presence status of one or more mobile tags is determined. For example, at 514, one or more mobile tags may report their estimated positions back to one or more anchors and then to a server by transmitting a wireless signal. In some embodiments, the report may include tag presence status information, such as the type of mobile tag providing the report, the estimated mobility or velocity of the tag providing the report, the estimated position of the tag providing the report, and the like. Also in some embodiments, one or more anchors receiving the report from a mobile tag may determine tag presence status information by e.g., determining a tag is present by virtue of the report's existence, or determining the type of tag based on a characteristic of the report (such as position, velocity, or acceleration). In these embodiments, different types of tags may have different mobility attributes such as expected velocity and/or acceleration profiles, and the anchor may determine the type of tag (e.g., pedestrian human, forklift, inventory product, etc.) based on the velocity and/or acceleration reported or determined. Also for example, at 518, one or more anchors may determine tag presence status for one or more mobile tags without receiving position reports. In some embodiments, one or more anchors may detect transmissions (other than position reports) made by mobile tags, and determine the presence or type of tag based on the detected transmissions. In other embodiments, one or more anchors may determine tag presence status for one or more mobile tags by analyzing signal(s) transmitted by other anchors. For example, an anchor may determine a channel impulse response (CIR) based on signals received from other anchors, and then may detect the physical presence of an object in the communication path by comparing received signals against the channel impulse response. These and other embodiments are described further below.

At 520, the server and/or anchor(s) use tag presence status information to modify the rate at which messages are broadcast into the area of interest. For example, in some embodiments, the rate at which messages are broadcast may be modified based on tag presence (or lack of presence), tag type, tag velocity, tag acceleration, tag position history, or any other attribute of one or more mobile tags.

In some embodiments, the rate may be reduced or increased based on tag type. For example, the rate may be reduced when a mobile tag type is determined to be a stationary inventory object, or the rate may be increased when the mobile tag type is determined to be a tag which has the highest mobility. Also for example, the rate may be reduced when the mix of tag types include or exclude a particular tag type, or may be increased or reduced based on a majority tag type. Examples include increasing the rate when humans and forklifts are both in the area of interest and reducing the rate when humans alone are in the area of interest. Also in some embodiments, the rate may be reduced or increased based on tag presence. For example, the rate may be reduced when it is determined that no mobile tags are present in the area of interest. The rate may also be reduced when it is determined that a small number of mobile tags are present in the area of interest (e.g., the number of mobile tags is below a threshold). Also for example, the rate may be increased when it is determined that a large number of mobile tags are present in the area of interest (e.g., the number of mobile tags is above a second threshold). Also in some embodiments, the rate may be reduced or increased based on motion characteristics of one or more tags. For example, the rate may be decreased when the velocity and/or acceleration of all mobile tags detected in the area of interest are below a threshold, and may be increased when the velocity and/or acceleration of one or more mobile tags detected in the area of interest are above a threshold. Any combination of the above mentioned criteria may be used to determine whether the rate at which messages are broadcast should be modified. For example, increased velocity of a forklift in the presence of a human may cause an increase in the rate, whereas the same increased velocity of the forklift in the absence of a human may not cause an increase in the rate.

In some embodiments, a rate at which messages are broadcast in a first area of interest may be modified in response to the tag presence status of one or more tags in a second area of interest. For example, the velocity and direction of movement of a tag in the second area of interest may indicate a trajectory of the tag. From the trajectory, it can be determined that the tag will enter the first area of interest at a particular time in the future. A future broadcast rate change in the first area of interest may be scheduled in anticipation of the tag moving from the second area of interest to the first area of interest. By way of example and not limitation, a future broadcast rate increase may be scheduled if a vehicle is predicted to enter an area of interest that includes pedestrians, or if a pedestrian is predicted to enter an area that previously had no tags.

Modifying the rate at which messages are broadcast into the area of interest based on tag presence status allows the tags to save power by not transmitting when not necessary and also allows a reduction in potential interference by anchors in embodiments in which the anchors transmit in the same frequency band.

Figure 11:
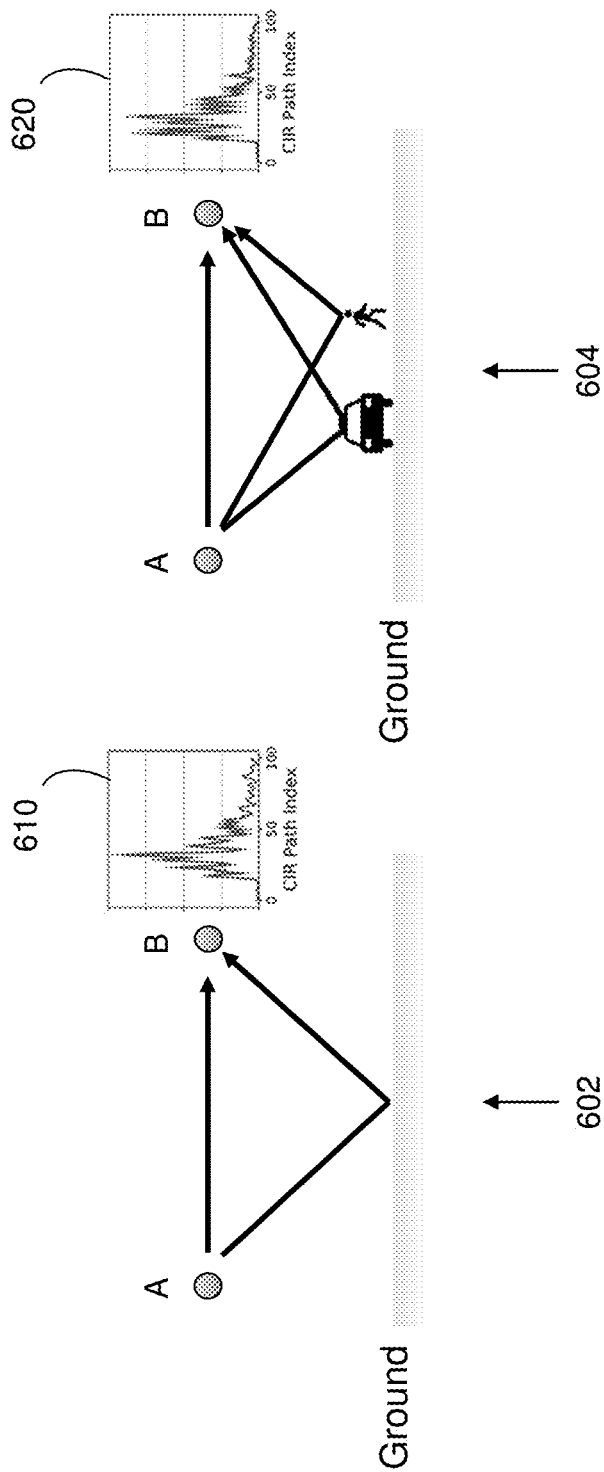
FIG. 11 is a block diagram illustrating an exemplary, non-limiting embodiment of tag detection using wireless channel impulse response in accordance with various aspects described herein.

FIG. 11 is a block diagram illustrating an exemplary, non-limiting embodiment of tag detection using wireless channel impulse response (CIR) in accordance with various aspects described herein. As illustrated in FIG. 11, various embodiments may determine tag presence status of one or more mobile tags by using wireless channel impulse response.

If there are no moving objects (i.e., no tag) in the area of interest, all objects in the area are stationary and the wireless CIR from wireless signals is in a certain pattern; however, if there are moving objects (i.e., tags) in the area, the pattern of the wireless CIR will be different since the wireless signals may be reflected/blocked by the moving objects.

As shown at 602, in some embodiments, the system may start with no mobile tags in the area of interest and learn the wireless CIR pattern 610 from of the communication paths between anchors A and B in the area of interest; and then when mobile tags are present in the area of interest as shown at 604, different CIR patterns are generated from wireless transmissions so the various embodiments may determine tag presence status of (e.g., the presence of one or more mobile tags from the CIR pattern 620.

Two anchors (A and B) are shown at 602. Anchor A sends a wireless signal to anchor B, and when there are no mobile tags in the communication path (the area of interest) the wireless signal received by anchor B shows a certain CIR pattern 610. When mobile tags (e.g., pedestrians and/or vehicles with tags) are present in the communication path as shown at 604, the wireless signal received by anchor B shows a different CIR pattern. CIR patterns may be compared to determine tag presence status. For example, CIR pattern 620 may be compared with CIR pattern 610 to determine that an object has moved in the area of interest. Based on this information, various embodiments may determine that a mobile tag is present in the area of interest.

Different CIRs may be generated based on different scenarios. For example, CIRs may be generated for "no mobile tag" scenarios when anchor B is receiving signals transmitted by anchor A, and may also be generated for "no mobile tag" scenarios when anchor A is receiving signals transmitted by anchor B. Accordingly, in some embodiments, one or more groups of CIRs for "no mobile tag" and "mobile tag(s) present" scenarios may be generated and compared to determine the presence of tag(s).

Figure 12:
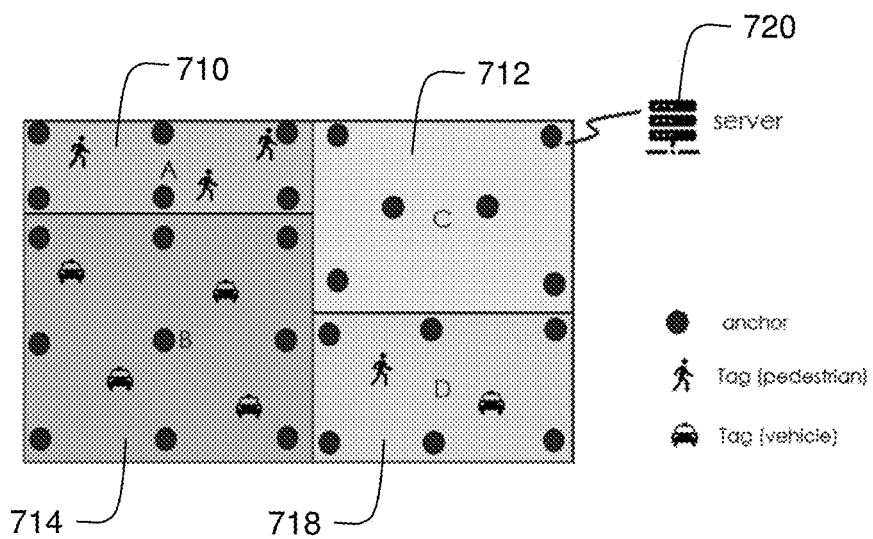
FIG. 12 is a block diagram illustrating an exemplary, non-limiting embodiment of area definitions within a network of anchors in accordance with various aspects described herein.

FIG. 12 is a block diagram illustrating an exemplary, non-limiting embodiment of area definitions within a network of anchors in accordance with various aspects described herein. As shown in FIG. 12, a demarcated area may include one or more areas of interest 710, 712, 714, and 716. In some embodiments the rate at which anchor messages are broadcast in the different areas of interest may be independently dynamically modified based on tag presence status of one or more areas of interest. For example, in areas 712 "C" and 710 "A", the rates may be reduced because no mobile tags are in area 712, and only pedestrians are in area 710. In some embodiments, the rate will be reduced more in are 712 than in area 710. Also for example, in areas 714 "B" and 718 "D", the rates may be increased because area 714 includes only vehicles and area 718 includes a combination pedestrians and vehicles. In some embodiments, the rate in area 718 may be increased more or less than in area 714 because area 718 includes a different mix of tag types than does area 714.

Figure 13:
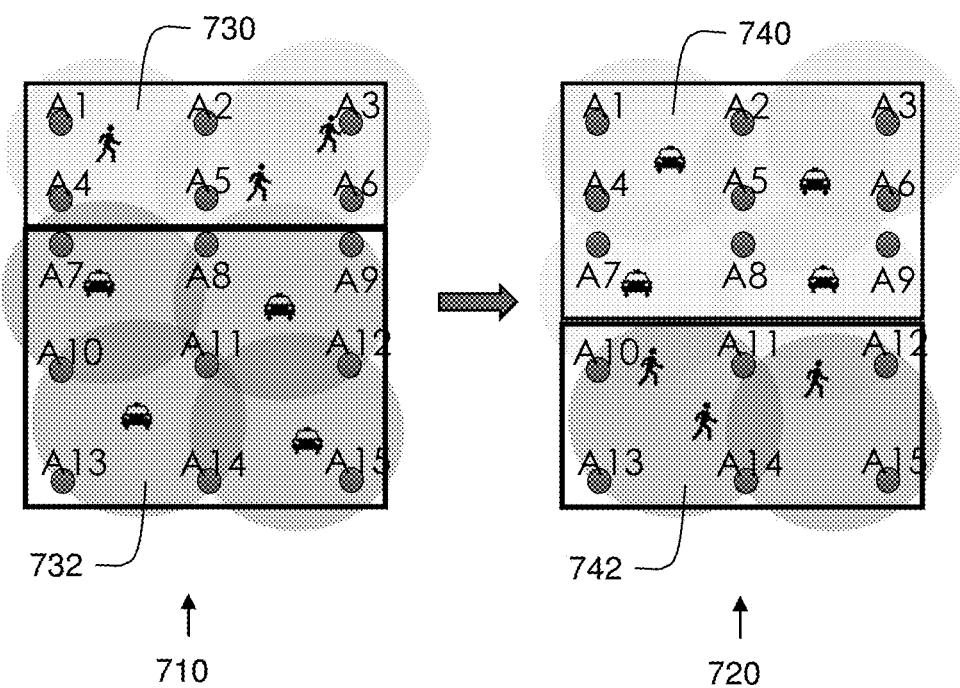
FIG. 13 is a block diagram illustrating an exemplary, non-limiting embodiment of dynamic area definitions within a network of anchors in accordance with various aspects described herein.

FIG. 13 is a block diagram illustrating an exemplary, non-limiting embodiment of dynamic area definitions within a network of anchors in accordance with various aspects described herein. Specifically, FIG. 13 shows a demarcated area that includes anchors A1-A15 initially having two areas of interest 730, 732 defined. In response to tag presence status determined over time, the areas of interest within the demarcated area may be redefined as areas interest 740, 742.

For example, in a particular time period 710, pedestrians may be concentrated in the area covered by anchors A1-A6 and vehicles may be concentrated in the area covered by anchors A7-A15. The area covered by anchors A1-A6 may then be defined as area of interest 730, so anchors A1-A6 can adapt the rate at which the anchors broadcast messages to pedestrian tags, and the area covered by anchors A7-A15 may then be defined as area of interest 732, so anchors A7-A15 can adapt the rate at which the anchors broadcast messages to vehicle tags. Also for example, in a second time period, 720, pedestrians may be concentrated in the area covered by anchors A10-A15 and vehicles may be concentrated in the area covered by anchors A1-A9. The area covered by anchors A10-A15 may then be defined as area of interest 742, so anchors A10-A15 can adapt the rate at which the anchors broadcast messages to pedestrian tags, and the area covered by anchors A1-A9 may then be defined as area of interest 740, so anchors A1-A9 can adapt the rate at which the anchors broadcast messages to vehicle tags.

In some embodiments, area definitions are modified based on tag presence status. For example, if a server and/or one or more anchors determined a change in tag presence status that warrants a dynamic modification of area of interest definitions, then the server and/or anchor(s) may make the modification and subsequently independently adjust the rate at which anchors broadcast messages in the various areas of interest.

In some embodiments, area definitions are modified based on a time of work shift, day, day of week, or other temporal criteria. For example, during the day, a particular area 730 may be inhabited by pedestrians performing manual tasks in a warehouse, whereas at night, the same area (or an intersecting area 740) may be inhabited by forklifts performing a restocking function.

Figure 14:
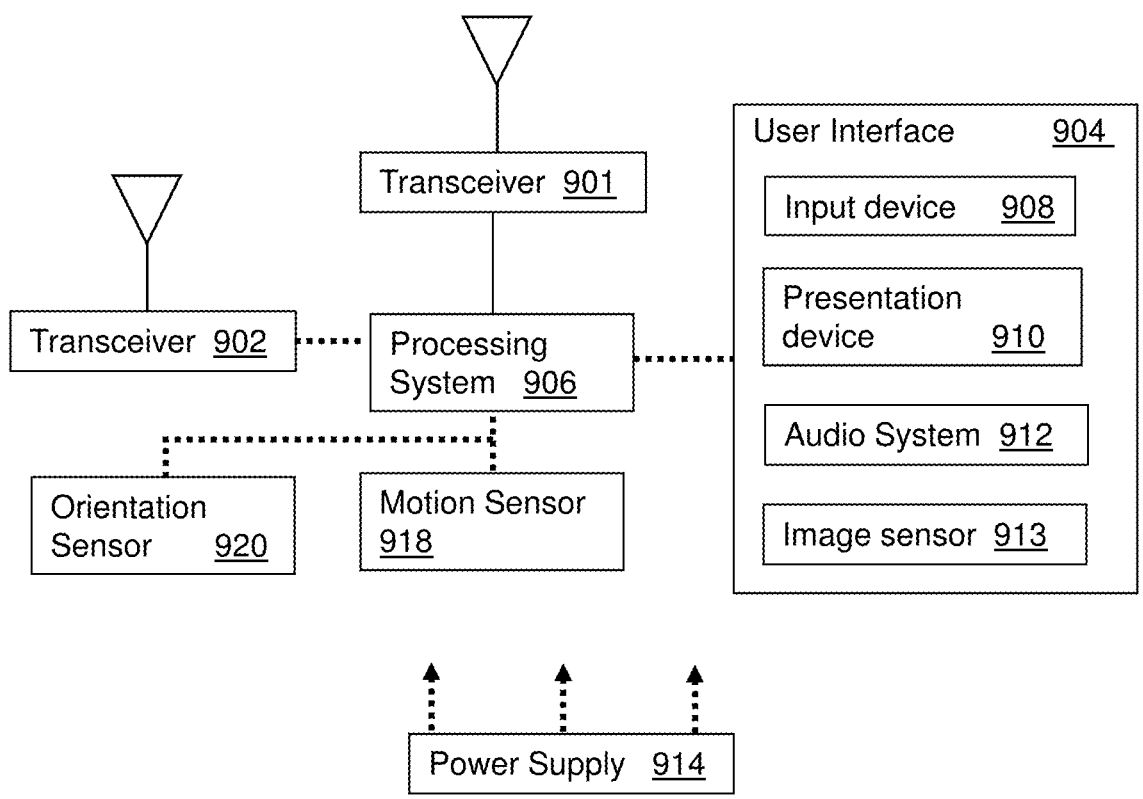
FIG. 14 is a block diagram of an example, non-limiting embodiment of a communication device in accordance with various aspects described herein.

FIG. 14 is a block diagram of an example, non-limiting embodiments of a communication device 900 in accordance with various aspects described herein. Communication device 900 can serve in whole or in part as an illustrative embodiment of a mobile tag or an anchor described herein. Further, communication device 900 may be configured to perform in whole or in part portions of any methods described herein.

In an embodiment, communication device 900 can comprise a first wireless transceivers 901, a user interface (UI) 904, a power supply 914, and a processing system 906 for managing operations of the communication device 900. In another embodiment, communication device 900 can further include a second wireless transceiver 902, a motion sensor 918, and an orientation sensor 920. The first wireless transceiver 901 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 902 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 902 can be utilized to conserve power and offload messaging between communication devices by utilizing narrow band signals such as Bluetooth®, ZigBee®, or WiFi, instead of ultra-wideband signals. One or both wireless transceivers 901, 902 can also be used for obtaining a strength indicator (RSSI). One or both wireless transceivers 901, 902 can also be equipped with multiple antennas and one or more phase detectors to determine angle of arrival of wireless signals and thereby an orientation of the communication device 900 (e.g., mobile tag 101) relative to another communication device 900 (e.g., anchor 204).

The UI 904 can include an input device 908 that provides at least one of one or more depressible buttons, a tactile keypad, a touch-sensitive keypad, or a navigation mechanism such as a roller ball, a joystick, or a navigation disk for manipulating operations of the communication device 900. The input device 908 can be an integral part of a housing assembly of the communication device 900 or an independent device operably coupled thereto by a tethered wireline interface (such as a USB cable) or a wireless interface supporting for example Bluetooth©. The UI 904 can further include a presentation device 910. The presentation device 910 can include a vibrator to generate haptic feedback, an LED (Light Emitting Diode) configurable by the processing system 906 to emit one or more colors, and/or a monochrome or color LCD (Liquid Crystal Display) or OLED (Organic LED) display configurable by the processing system to present alphanumeric characters, icons or other displayable objects.

The UI 904 can also include an audio system 912 that utilizes audio technology for conveying low volume audio (for proximity listening by a user) and/or high volume audio (for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images in a vicinity of the communication device 900. The camera can be used for performing facial recognition and user ID recognition that can be combined with embodiments of the subject disclosure.

The power supply 914 can utilize common power management technologies such as replaceable and rechargeable batteries, supply regulation technologies, and/or charging system technologies for supplying energy to the components of the communication device 900 to facilitate portable applications. Alternatively, or in combination, the charging system can utilize external power sources such as DC power supplied over a physical interface such as a USB port or other suitable tethering technologies.

The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (in degrees, minutes, or other suitable orientation metrics). In some embodiments, the orientation sensor 920 can replace a need for utilizing multiple antennas with the first and/or second wireless transceivers 901, 902 and a phase detector for performing angle of arrival measurements. In other embodiments, the function of the orientation sensor 920 can be combined with an angle of arrival measurement performed with multiple antennas with the first and/or second wireless transceivers 901, 902 and a phase detector.

The processing system 906 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 20 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings.

The communication device 900 as described herein can operate with more or less of the circuit components shown in FIG. 14. These variant embodiments can be used in one or more embodiments of the subject disclosure.

Figure 15:
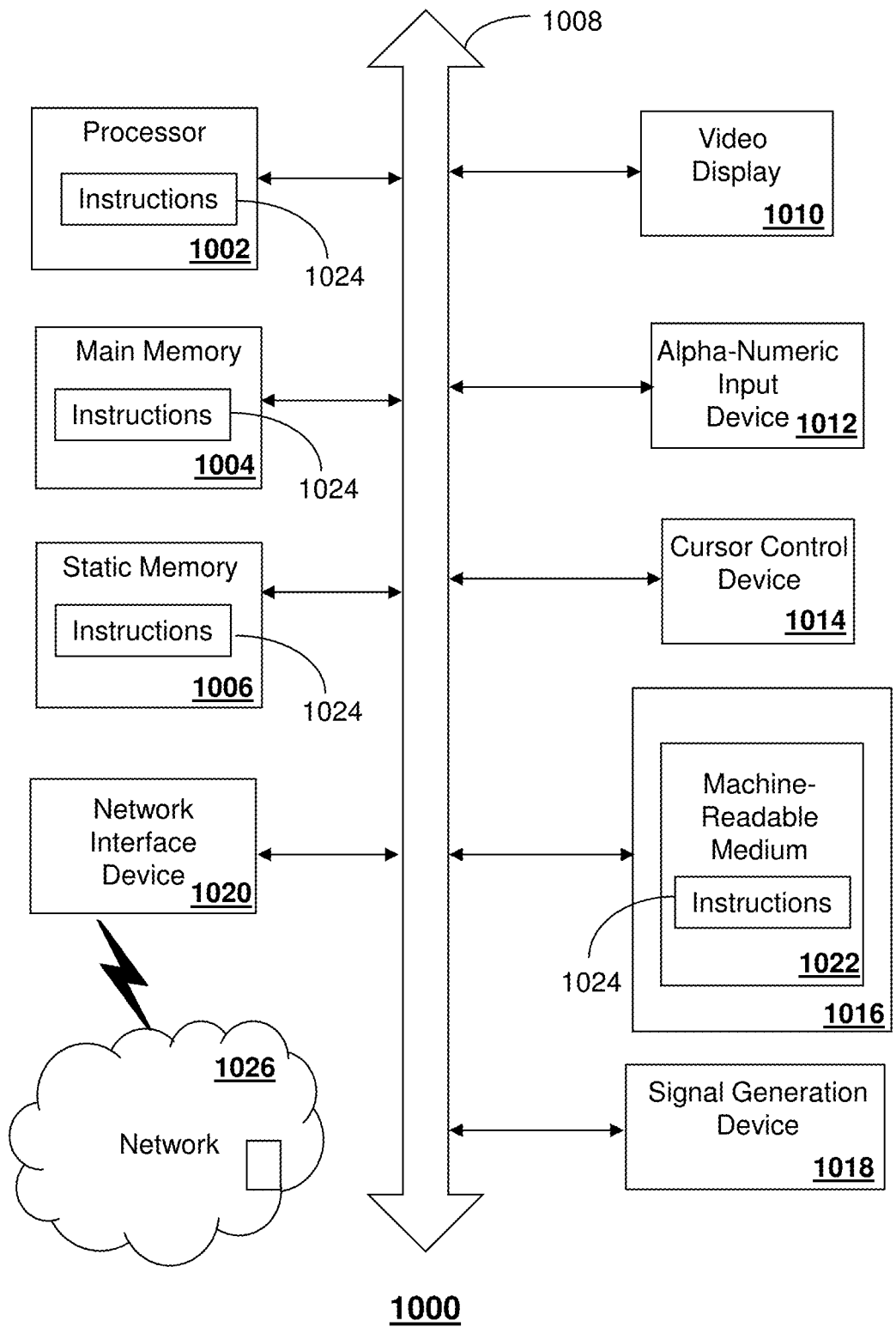
FIG. 15 is a block diagram of an example, non-limiting embodiment of a computing system in accordance with various aspects described herein.

FIG. 15 depicts an exemplary diagrammatic representation of a machine in the form of a computing system 1000 within which a set of instructions, when executed, may cause the machine to perform any one or more of the methods described above. One or more instances of the machine can operate, for example, as the computing system referred to in methods described herein. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An apparatus, comprising:
a processing system including a processor;
a memory that stores executable instructions that, when executed by the processing system, facilitate performance of operations, the operations comprising:
periodically broadcasting into an area of interest, by one or more pairs of anchors, wireless signals to enable tags in the area of interest to estimate tag position based at least in part on the wireless signals;
determining a tag presence status in the area of interest; and
responsive to the tag presence status, modifying a rate at which the wireless signals are periodically broadcast into the area of interest, wherein the modifying of the rate comprises decreasing the rate when the tag presence status indicates that a number of tags present in the area of interest is less than a first threshold, and wherein the modifying of the rate comprises increasing the rate when the tag presence status indicates that the number of tags present in the area of interest exceeds a second threshold that is different from the first threshold,
wherein the determining the tag presence status comprises detecting a tag's presence in the area of interest using one or more channel impulse responses, and
wherein detecting the tag's presence in the area of interest using one or more channel impulse responses comprises:
transmitting a first wireless signal by a first anchor of the one or more pairs of anchors;
receiving the first wireless signal by a second anchor of the one or more pairs of anchors;
measuring a first channel impulse response of the one or more channel impulse responses when no tags are in the area of interest; and
comparing the first channel impulse response to at least a portion of a second wireless signal received at the second anchor.

2. The apparatus of claim 1, wherein the determining the tag presence status comprises determining a tag type of at least one tag in the area of interest.

3. The apparatus of claim 2, further comprising redefining the area of interest based at least in part on the tag type.

4. The apparatus of claim 1, wherein the determining the tag presence status comprises receiving tag position information from a wireless signal transmitted by at least one tag.

5. The apparatus of claim 1, wherein the modifying the rate comprises modifying the rate when no tags are detected in the area of interest.

6. The apparatus of claim 1, wherein the modifying the rate comprises modifying the rate based at least in part on a tag mobility in the area of interest.

7. A non-transitory machine-readable medium, comprising executable instructions that, when executed by a processing system including a processor, facilitate performance of operations, the operations comprising:
periodically broadcasting into an area of interest, by one or more pairs of anchors, wireless signals to enable tags in the area of interest to estimate tag position based at least in part on the wireless signals;
determining a tag presence status in the area of interest; and
responsive to the tag presence status, modifying a rate at which the wireless signals are periodically broadcast into the area of interest, wherein the modifying of the rate comprises decreasing the rate when the tag presence status indicates that a number of tags present in the area of interest is less than a first threshold, and wherein the modifying of the rate comprises increasing the rate when the tag presence status indicates that the number of tags present in the area of interest exceeds a second threshold that is different from the first threshold,
wherein the determining the tag presence status comprises detecting a tag's presence in the area of interest using one or more channel impulse responses, and
wherein detecting the tag's presence in the area of interest using the channel impulse response comprises:

transmitting a first wireless signal by a first anchor of the one or more pairs of anchors;

receiving the first wireless signal by a second anchor of the one or more pairs of anchors;

measuring a first channel impulse response of the one or more channel impulse responses when no tags are in the area of interest; and comparing the first channel impulse response to at least a portion of a second wireless signal received at the second anchor.

8. The non-transitory machine-readable medium of claim 7, wherein the determining the tag presence status comprises receiving tag position information from wireless signals transmitted by at least one tag.

9. The non-transitory machine-readable medium of claim 7, wherein the modifying the rate comprises modifying the rate when no tags are detected in the area of interest.

10. A method comprising:

commanding one or more pairs of anchors, by a processing system including a processor, to periodically broadcast wireless signals into an area of interest to enable tags in the area of interest to estimate tag position based at least in part on the wireless signals;

determining, by the processing system, a tag presence status in the area of interest;

responsive to the tag presence status, modifying, by the processing system, a rate at which the wireless signals are periodically broadcast into the area of interest, wherein the modifying of the rate comprises decreasing the rate when the tag presence status indicates that a number of tags present in the area of interest is less than a first threshold, and wherein the modifying of the rate comprises increasing the rate when the tag presence status indicates that the number of tags present in the area of interest exceeds a second threshold that is different from the first threshold;

obtaining, by the processing system, a velocity and direction of movement of a tag in a second area of interest to obtain a trajectory of the tag in the second area of interest;

determining, by the processing system, a time in which the tag in the second area of interest will enter the area of interest in accordance with the trajectory, resulting a determined time; and scheduling, by the processing system, a change in the rate at which the wireless signals are periodically broadcast into the area of interest based on the determined time.

11. The method of claim 10, wherein the determining the tag presence status comprises receiving tag position information from wireless signals transmitted by at least one tag.

12. The method of claim 10, wherein the determining the tag presence status comprises detecting an tag's presence in the area of interest using one or more channel impulse responses.

* * * * *